US008782716B2

(12) United States Patent
Bayer et al.

(10) Patent No.: US 8,782,716 B2
(45) Date of Patent: Jul. 15, 2014

(54) SYSTEMS AND METHODS FOR RENDERING USER INTERFACE OBJECTS IN ACCORDANCE WITH A VARIABLE SCALING FACTOR

(75) Inventors: Jason Bayer, San Francisco, CA (US); Daniel Lawrence Morrill, Mountain View, CA (US); Leo Baghdassarian, Palo Alto, CA (US); Eric Vannier, Union City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/556,097

(22) Filed: Jul. 23, 2012

(65) Prior Publication Data

US 2013/0027614 A1    Jan. 31, 2013

Related U.S. Application Data

(60) Provisional application No. 61/513,444, filed on Jul. 29, 2011.

(51) Int. Cl.
*H04N 7/18* (2006.01)
*H04N 5/445* (2011.01)
*H04N 7/173* (2011.01)
*G06F 3/00* (2006.01)
*G06F 13/00* (2006.01)
*G09G 5/00* (2006.01)

(52) U.S. Cl.
USPC ............... 725/80; 725/37; 725/139; 345/660

(58) Field of Classification Search
CPC ....... G06F 3/0488; G06F 3/017; G06F 3/048; G06T 3/40; G09G 5/00
USPC .......................................................... 345/660
See application file for complete search history.

(56) References Cited

U.S. PATENT DOCUMENTS

| | | | |
|---|---|---|---|
| 7,924,297 B2* | 4/2011 | Morikawa et al. | 345/660 |
| 2004/0119708 A1* | 6/2004 | Hasegawa | 345/419 |
| 2005/0229200 A1 | 10/2005 | Kirkland et al. | |
| 2005/0239401 A1 | 10/2005 | Nam | |
| 2008/0240890 A1* | 10/2008 | Biel et al. | 414/222.01 |
| 2008/0270890 A1* | 10/2008 | Stern | 715/239 |
| 2009/0079765 A1* | 3/2009 | Hoover | 345/660 |
| 2010/0138780 A1 | 6/2010 | Marano et al. | |
| 2011/0164061 A1* | 7/2011 | Weiss et al. | 345/660 |
| 2012/0280901 A1* | 11/2012 | Kim | 345/156 |

OTHER PUBLICATIONS

Google Inc., ISR/WO, PCT/US2012/048114, Dec. 20, 2012, 7 pgs.

* cited by examiner

*Primary Examiner* — Benjamin R Bruckart
*Assistant Examiner* — Akshay Doshi
(74) *Attorney, Agent, or Firm* — Morgan, Lewis & Bockius LLP (57) ABSTRACT

A method for rendering one or more user interface objects on a television screen is disclosed. The method is performed at a computer system coupled with the television screen. The method includes receiving a request for rendering a user interface object, and identifying a variable scaling factor. The variable scaling factor is determined in accordance with a distance parameter corresponding to a distance between a respective user and the television screen. The method also includes rendering the user interface object on the television screen in accordance with the variable scaling factor while maintaining a display of a television program on the television screen based on a fixed scaling factor.

14 Claims, 8 Drawing Sheets

SYSTEMS AND METHODS FOR RENDERING USER INTERFACE OBJECTS IN ACCORDANCE WITH A VARIABLE SCALING FACTOR

RELATED APPLICATION

This application claims priority to U.S. Provisional Application Ser. No. 61/513,444, filed Jul. 29, 2011, entitled "Systems and Methods for Rendering User Interface Objects in Accordance with a Variable Scaling Factor," which is incorporated by reference herein in its entirety.

TECHNICAL FIELD

The disclosed implementations relate generally to rendering user interface objects on television screens. More particularly, the disclosed implementations relate to methods and systems for rendering user interface objects on television screens in accordance with variable scaling factors.

BACKGROUND

Television devices (e.g., televisions and receivers coupled to televisions) have been traditionally used to access various television programs. Increasingly, non-television devices (e.g., desktop computers, notebook computers, mobile telephones, etc.), typically used for accessing other multimedia contents and information from websites and executing and displaying programs, are also used to access television programs. Conversely, instead of just being used to receive and display television programming, television devices can also be used to access other multimedia contents and information from websites and executing and displaying programs.

Non-television devices typically have screens that are smaller than the television screens. In addition, television screens, when in use, are typically located further from users than the screens of the non-television devices used by respective users. Thus, displaying user interface objects on television devices requires considerations different from displaying similar user interface objects on non-television devices.

SUMMARY

A number of implementations (e.g., of computer systems or devices, and methods of operating such systems or devices) that overcome the limitations and disadvantages described above are presented in more detail below. These implementations provide methods, systems, and graphical user interfaces (GUIs) for using rendering one or more adjustable user interface objects on a television screen.

As described in more detail below, some implementations involve a method performed at a computer system coupled with a television screen. The computer system includes one or more processors and memory storing one or more programs, for execution by the one or more processors, for rendering one or more user interface objects on the television screen. The method includes receiving a request for rendering a user interface object, and identifying a variable scaling factor. The variable scaling factor is determined in accordance with a distance parameter corresponding to a distance between a respective user and the television screen. The method also includes rendering the user interface object on the television screen in accordance with the variable scaling factor while maintaining a display of a television program on the television screen based on a fixed scaling factor.

In accordance with some implementations, a computer system coupled with a television screen includes one or more processors, and memory storing one or more programs, for execution by the one or more processors, for rendering one or more user interface objects on the television screen. The one or more programs including instructions for receiving a request for rendering a user interface object, and identifying a variable scaling factor. The variable scaling factor is determined in accordance with a distance parameter corresponding to a distance between a respective user and the television screen. The one or more programs also include instructions for rendering the user interface object on the television screen in accordance with the variable scaling factor while maintaining a display of a television program on the television screen based on a fixed scaling factor.

In accordance with some implementations, a non-transitory computer readable storage medium stores one or more programs for execution by one or more processors of a computer system coupled with a television screen. The one or more programs include instructions for receiving a request for rendering a user interface object, and identifying a variable scaling factor. The variable scaling factor is determined in accordance with a distance parameter corresponding to a distance between a respective user and the television screen. The one or more programs also include instructions for rendering the user interface object on the television screen in accordance with the variable scaling factor while maintaining a display of a television program on the television screen based on a fixed scaling factor.

Thus, computer systems coupled with television screens are provided with improved methods for rendering adjustable user interface objects. The adjustable user interface objects are rendered in accordance with variable scaling factors, thereby enabling respective users to efficiently interact with the adjustable user interface objects.

BRIEF DESCRIPTION OF THE DRAWINGS

For a better understanding of the aforementioned implementations as well as additional aspects and implementations thereof, reference should be made to the Description of Implementations below, in conjunction with the following drawings in which like reference numerals refer to corresponding parts throughout the figures.

Like reference numerals refer to corresponding parts throughout the drawings.

DETAILED DESCRIPTION

Methods and systems for rendering user interface objects in accordance with variable scaling factors are described. Reference will be made to certain implementations, examples of which are illustrated in the accompanying drawings. While the invention will be described in conjunction with the implementations, it will be understood that the implementations are not intended to limit the invention to these particular implementations alone.

Moreover, in the following description, numerous specific details are set forth to provide a thorough understanding of the described implementations. However, it will be apparent to one of ordinary skill in the art that some implementations may be practiced without these particular details. In other instances, methods, procedures, components, and networks that are well-known to those of ordinary skill in the art are not described in detail to avoid obscuring aspects of the implementations described in this document.

Figure 1:
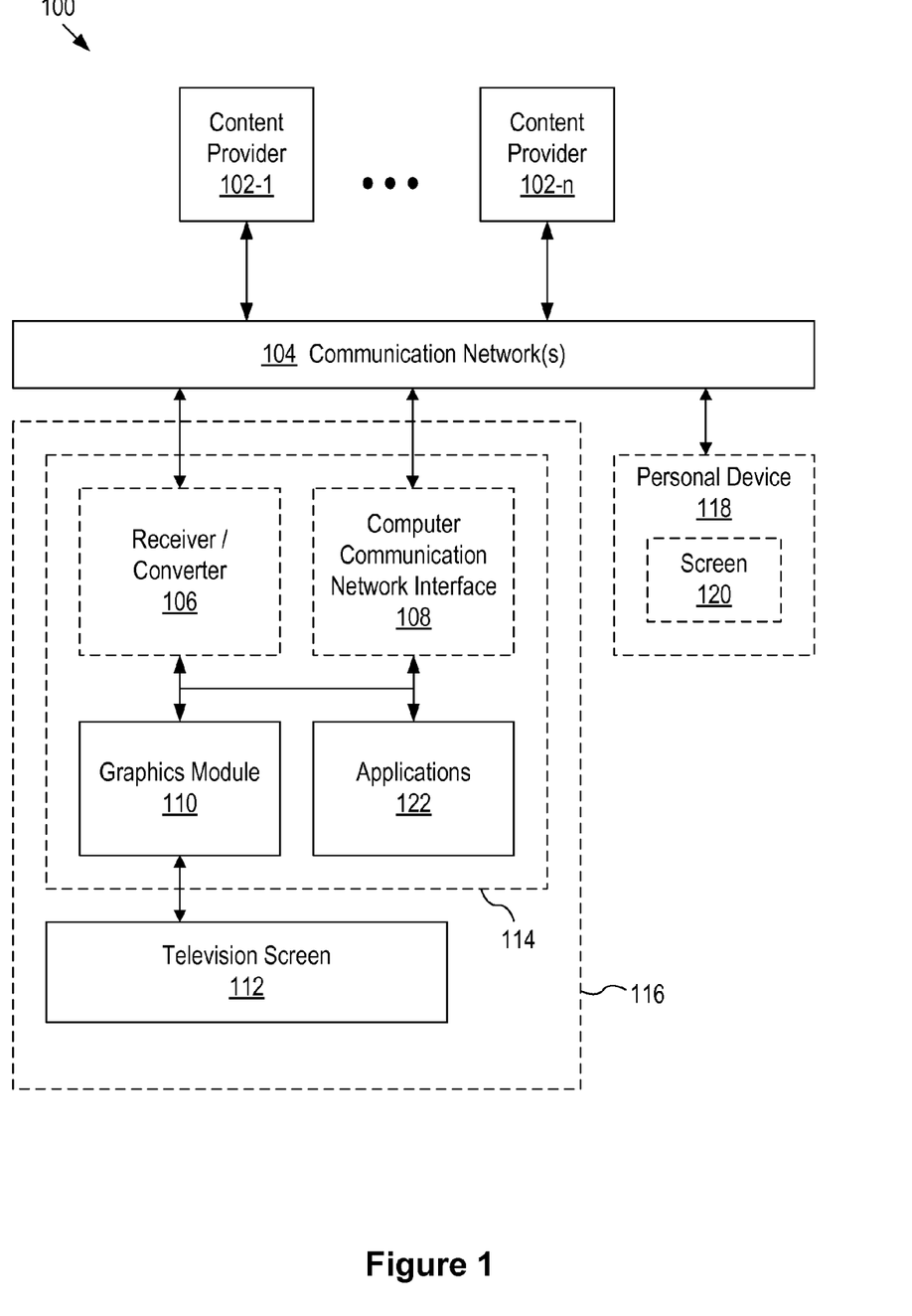
FIG. 1 is a block diagram illustrating an exemplary content distribution system, in accordance with some implementations.

FIG. 1 is a block diagram illustrating an exemplary content distribution system 100, according to certain implementations. In FIG. 1, the system 100 includes one or more content providers 102 and communications networks 104. Connected to the communication networks 104 is a companion device 114 coupled with a television screen 112 or an integrated television device 116 that includes the television screen 112 and components of the companion device 114. In some implementations, the companion device 114 is a set-top box or is a computing device that includes set-top box functionality. Various implementations of the companion device 114 and/or the integrated television device 116 implement the methods described in this document. For the purposes of this application, a television screen 112 is any large viewing screen (e.g., in some implementations, a viewing screen 26" or larger) fabricated using any suitable display technology (e.g., projection, LCD, plasma, OLED, CRT, etc.) that is intended for viewing from a distance of more than a few feet and for displaying images—commonly in response to some manner of remote control.

As used herein, content providers 102 are systems or devices configured to provide media content (e.g., music, television programs, movies, social media data, web data, etc.). The content providers 102 can be any of a number of content provider systems, equipment, and/or devices that provide media content (e.g., radio broadcasting systems, on-air television broadcasting systems, cable service systems, direct satellite broadcasting systems, Internet television service servers, Internet radio station servers, web servers, digital video recorders, etc.). In some implementations, at least a subset of the media contents distributed by the content providers 102 includes audio data (e.g., music, radio programs, television programs, movies, etc.). In some implementations, at least a subset of the media contents distributed by the content providers 102 includes video data (e.g., photos, television programs, movies, etc.). In some implementations, at least a subset of the media contents distributed by the content providers 102 includes multimedia data (e.g., television programs, movies, etc.). In some implementations, at least a subset of the media contents distributed by the content providers 102 includes user-readable text (e.g., messages sent via short message services, postings on blogs or other social networking media, web pages, etc.).

The content providers 102 distribute media contents via the communication networks 104. The communication networks 104 may include one or more of: radio-frequency communication networks used for on-air or satellite television broadcasting, radio-frequency communication networks used for on-air radio broadcasting, cable-based communication networks, digital audio/video communication networks, the Internet, other wide area networks, local area networks, metropolitan area networks, wireless networks, cellular networks, and so on.

In some implementations, the companion device 114 or the integrated television device 116 includes a receiver/converter 106 connected to the communication networks 104 and configured to receive audio and/or video signals, typically via one or more of radio-frequency communication networks and/or one or more digital audio/video communication networks.

In some implementations, the companion device 114 or the integrated television device 116 includes one or more computer communication network interfaces 108 that are configured for interfacing with one or more computer communication networks, such as the Internet, other wide area networks, local area networks, metropolitan area networks, wireless networks, cellular networks, and so on.

The companion device 114 or the integrated television device 116 stores and/or executes applications 122. The applications 122 include application programs used for managing the companion device 114 or the integrated television device 116, including, in some implementations, applications for controlling the display on the television screen of media content from one or more of the content providers 102. For example, at least one of the applications 122 is configured to receive data from the receiver/converter 106 and/or the computer communication network interface 108 and send data and instructions to a graphics module 110 for rendering media and program content, including user interfaces and/or user interface objects.

As used herein, the term "user interface object" refers to a display element displayed on a display screen of a device. Exemplary user interface objects include, but are not limited to, buttons, icons, menus, menu options, cursors, information bars, texts, windows, etc.

The graphics module 110 includes one or more display processors or graphics processing units for rendering user interfaces and/or user interface objects. In some implementations, the graphics module 110 receives data from the receiver/converter 106 and/or the computer communication network interface 108, and additional data or instructions from the applications 122 for rendering user interfaces and/or user interface objects. The user interfaces and/or user interface objects rendered by the graphics module 110 are sent to the television screen 112 for display. Visual characteristics of the media and program content displayed on the television screen 112 (e.g., the size and detail of particular user interfaces and/or interface objects) reflect a number of display parameters of the television screen 112, including display resolution, video resolution/pixel density, and size of the television screen 112.

As used herein, the term "resolution" of a display refers to the number of pixels (also called "pixel counts" or "pixel resolution") along each axis or in each dimension of the display. For example, a display may have a resolution of 1920×1080 pixels. Furthermore, as used herein, the term "resolution" of a device refers to the resolution of a display coupled with the device. The term "resolution" does not imply any limitations on the size of each pixel or the spacing of pixels. For example, compared to a first display with a 1920×1080-pixel resolution, a second display with a 1280×720-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

The companion device 114 or the integrated television device 116 may include additional components not illustrated in FIG. 1.

Also illustrated in FIG. 1 is a personal device 118. The personal device 118 may be any of a number of computing devices (e.g., Internet kiosk, personal digital assistant, cell phone, smart phone, gaming device, desktop computer, laptop computer, tablet computer, handheld computer, or combinations thereof) used to enable the activities described below. The personal device 118 includes a display screen 112 where a graphical user interface (GUI) can be displayed. In some implementations, the personal device 118 is also configured to receive media content from the content providers 102 via the communication networks 104, and display the received media content.

In some implementations, the applications 122 can be executed on either or both a personal device 118 or a companion device 114, in which case the application output, including user interface elements, is presented on either the television screen 112 or the personal device screen 120. For example, an application can be an Android application that can be executed on a companion device 114 (such as a Google TV-enabled set-top box) and a smart phone/personal device 118 (such as an Android phone). This presents the challenge of providing a consistent user interface for an application 122 regardless of whether its visual outputs are displayed at a distance, on a television screen 112, or nearby, on a personal device screen 120. For example, depending on how the user interface of an application 122 is configured, the user interface elements when displayed on a television screen 112 might be unreasonably large (occupying too much screen real estate) or too small for a user to interact with from a distance using a remote control device. A method is described herein for providing a consistent user interface for applications 122 that can be executed on both device types 114, 118 by adjusting the size of a particular user interface element when displayed on a television with particular display characteristics at a particular distance from a user, such that the size of the particular user interface element when viewed on such a television display 112 would appear to be approximately the same size as if that interface element were displayed on the portable device screen 120.

Figure 2:
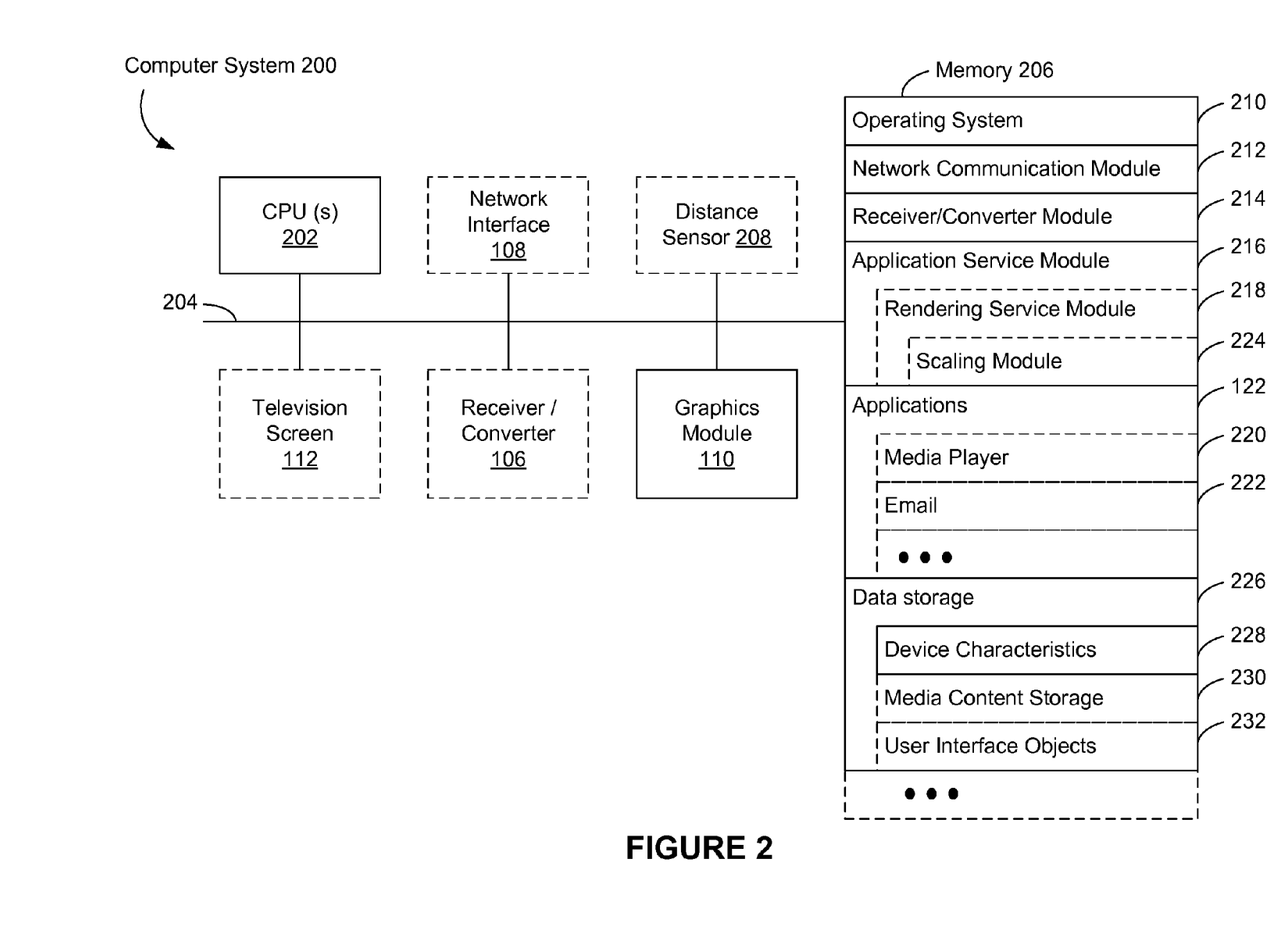
FIG. 2 is a block diagram illustrating a computer system, in accordance with some implementations.

FIG. 2 is a block diagram illustrating a computer system 200 in accordance with some implementations. In some implementations, the computer system 200 corresponds to the companion device 114 or the integrated television device 116 (FIG. 1).

The computer system 200 typically includes one or more processing units (CPUs) 202, graphics module 110, and memory 206. In some implementations, the computer system 200 also includes one or more of: one or more network or other communications interfaces 108, one or more receivers and/or converters 106, and one or more distance sensors 208. The computer system 200 includes one or more communication buses 204 for interconnecting these components. In some implementations, the communication buses 204 include circuitry (sometimes called a chipset) that interconnects and controls communications between system components. In some other implementations, the computer system 200 includes a user interface (not shown) (e.g., a keyboard, and a mouse or other pointing device). The computer system 200 is coupled with the television screen 112, regardless of whether the television screen 112 is integrated with the computer system 200 or located outside the computer system 200. The television screen 112 may be used to display a graphical user interface.

In some implementations, the one or more distance sensors 208 are used to determine a distance between a user of the computer system 200 and the television screen 112. In some implementations, the one or more distance sensors 208 include one or more cameras that can monitor the distance between the user of the computer system 200 and the television screen 112. In some implementations, the one or more distance sensors 208 include ultrasound sensors or infrared sensors that are used to determine the distance between the user of the computer system 200 and the television screen 112. Typically, the one or more distance sensors 208 are activated only with an explicit permission (e.g., an opt-in approval) of the user.

The memory 206 of the computer system 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. In some implementations, the memory 206 or the computer readable storage medium of the memory 206 stores the following programs, modules and data structures, or a subset thereof:

operating system 210 that includes procedures for handling various basic system services and for performing hardware dependent tasks;

network communication module (or instructions) 212 that is used for connecting the computer system 200 to the content providers (e.g., content providers 102, FIG. 1) via one or more network interfaces 108 and one or more communications networks 104 (FIG. 1), such as the Internet, other wide area networks, local area networks, metropolitan area networks, wireless networks, cellular networks, and so on;

receiver/converter module (or instructions) 214 that is used for receiving media content from the content providers (e.g., content providers 102) via one or more receivers/converters 106 and one or more communications networks 104, such as radio-frequency audio/video communication networks, cable-based communication networks, digital audio/video communication networks, and so on;

application service module 216 that provides various services to the applications 122;

applications 122 that include various applications executed by the one or more processing units 202 causing the computer system 200 to perform certain operations (e.g., a media player 220, which, when executed, displays contents of media data; an email application 222, which, when executed, displays one or more email messages, etc.); and data storage 226 that stores various data used by the computer system 200.

The data storage 226 typically includes device characteristics 228 that identify characteristics (e.g., specifications, operating modes, etc.) of the computer system 200 and/or the television screen 112. The device characteristics 226 are described in detail with respect to FIG. 5.

In some implementations, the data storage 226 includes media content storage 230. The media content storage 230 may store a complete media data for a particular program (e.g., a music file corresponding to an entire song, a multimedia data including an entire length of a television program episode or a movie, etc.), which may be played at a time desired by a user. The media content storage 230 may store a portion of a particular program, which may be used for improving the quality of playing the particular program (e.g., for caching or for content analysis for finding related programs and/or services).

In some implementations, the data storage 226 includes user interface objects 232. In some implementations, the user interface objects 232 include a set of multiple user interface objects that correspond to a same user interface object type, where each user interface object in the set has a distinct resolution (e.g., a distinct number of pixels). A respective user interface object in the set may be used for rendering a user interface object of a distinct size.

The application service module 216 includes one or more service modules to provide various application services (e.g., memory management, graphics rendering, etc.) to the applications 122. In some implementations, the application service module 216 is included in the operating system 210. In some implementations, the application service module 216 includes a rendering service module 218 for sending data and/or instructions to the graphics module 110 for rendering user interfaces and/or user interface objects. In some implementations, the rendering service module 218 includes a scaling module 224, which is used for determining a variable scaling factor and rendering one or more user interface objects in accordance with the variable scaling factor.

Figure 5:
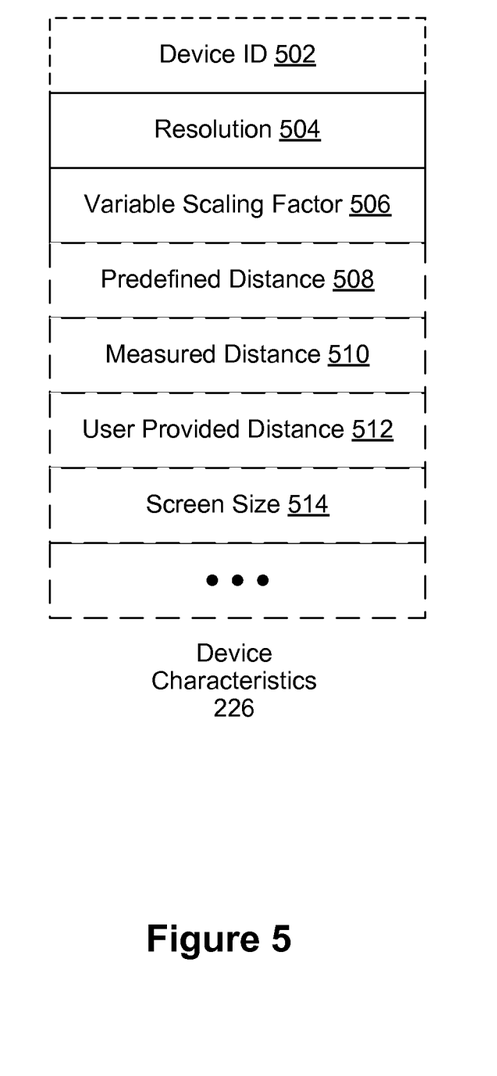
FIG. 5 is a block diagram illustrating an exemplary data structure, in accordance with some implementations.

In some implementations, the scaling module 224 retrieves one or more parameters from the device characteristics 226 (e.g., a resolution 504, predefined distance 508, measured distance 510, user provided distance 512, and/or screen size 514, FIG. 5) for determining the variable scaling factor. In some implementations, the scaling module 224 stores the determined variable scaling factor into the device characteristics 226 as a variable scaling factor 506.

Optionally, the memory 206 may include additional applications, modules, or components. In some implementations, the computer system 200 includes additional components not illustrated in FIG. 2. For example, the computer system 200 may include one or more audio modules for generating and/or amplifying audio signals. The computer system 200 may also include a security module for protecting the data stored in the computer system 200.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various implementations. In some implementations, the memory 206 may store a subset of the modules and data structures identified above. Furthermore, the memory 206 may store additional modules and data structures not described above.

Notwithstanding the discrete blocks in FIGS. 1 and 2, these figures are intended to provide functional descriptions of some implementations rather than structural descriptions of functional elements in the implementations. One of ordinary skill in the art will recognize that an actual implementation might have the functional elements grouped or split among various components. In practice, and as recognized by those of ordinary skill in the art, items shown separately could be combined and some items could be separated. For example, in some implementations, the television screen 112 is included in the computer system 200. In other implementations, the television screen 112 is physically separated from the computer system 200. In some implementations, the CPUs 202 and the memory 206 are included in a single semiconductor package. In some implementations, the CPUs 202 and the graphics module 110 are included in a single semiconductor package. In some implementations, the computer system 200 is implemented on multiple distributed computer systems. In some implementations, the rendering service module 218 and/or the scaling module 224 are integrated into the application service module 216, and the rendering service module 218 and/or the scaling module 224 may not exist as separate modules.

The actual number of components used to implement the computer system 200 and how features are allocated among them will vary from one implementation to another, and may depend in part on the amount of data traffic that the system must handle during peak usage periods as well as during average usage periods, and may also depend on the amount of data stored by the computer system 200. Moreover, one or more of the blocks (e.g., the television screen 112, and the receiver/converter 106, etc.) in FIGS. 1 and 2 may be implemented on one or more separate devices designed to provide the described functionality. Although the description herein refers to certain features implemented in the television device and the computer system 200, the implementations are not limited to such distinctions. For example, features described herein as being part of the computer system 200 can be implemented in whole or in part in the television device, and vice versa.

Figure 3:
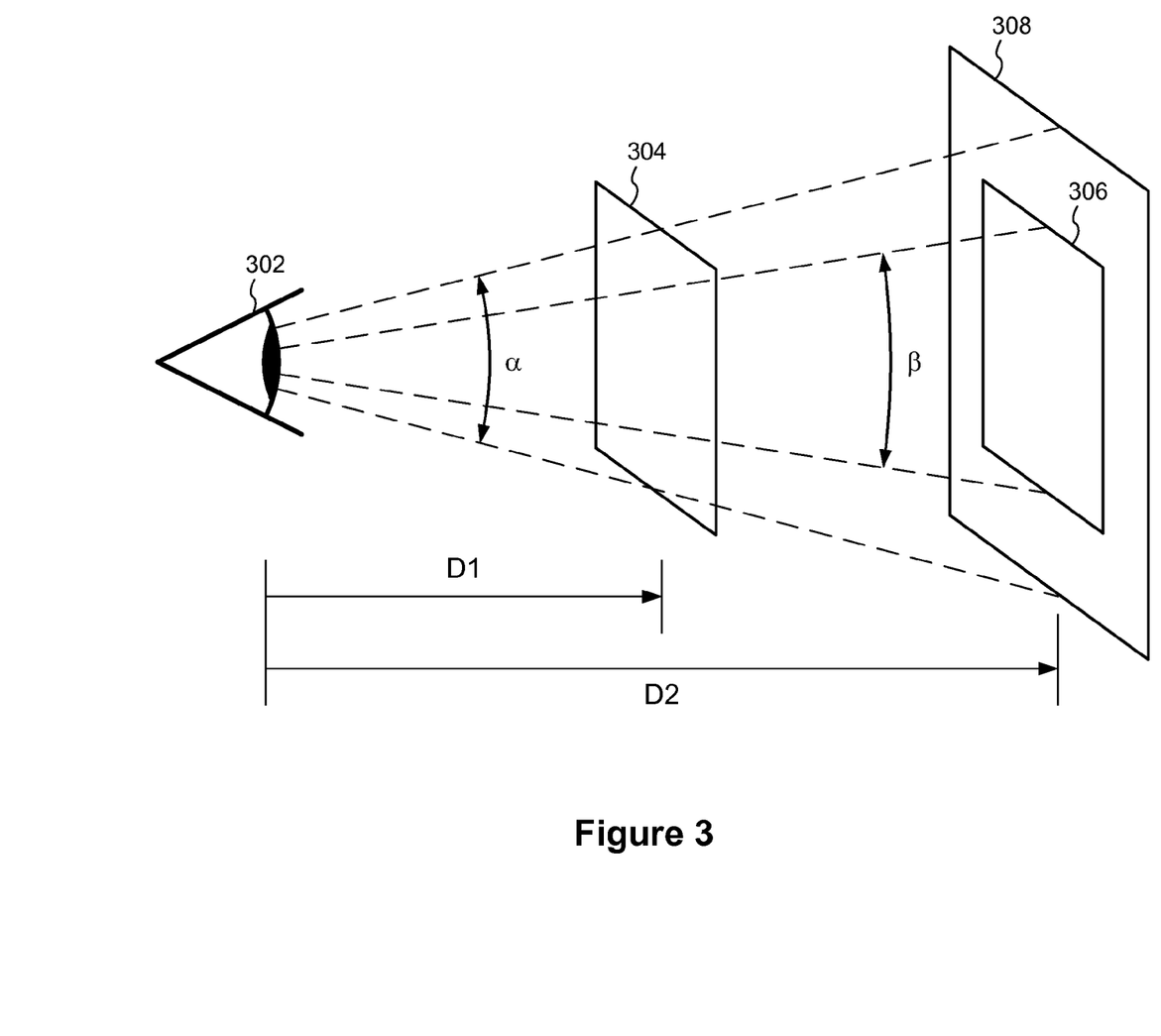
FIG. 3 illustrates respective angles occupied by respective user interface objects, in accordance with some implementations.

FIG. 3 illustrates respective angles occupied by respective user interface objects, in accordance with some implementations. As described above, in some implementations the scaling module 224 (FIG. 2) adjusts the size of an icon or other user interface element on the TV screen 112 such that the angle of that user interface element would appear to be apparently the same as the same icon presented on a nearby portable device 118.

Shown in FIG. 3 is an eye 302 of a respective user. Also shown in FIG. 3 is a first user interface object 304 located at a distance D1 from the eye 302. The first user interface object 304 when viewed from the eye 302 occupies a first angle α.

When a second user interface object 306 that has the same size as the first user interface object 304 is viewed from the eye 302 located at a distance D2 from the second user interface object 306, the second user interface object 306 occupies a second angle β that is smaller than the first angle α. Thus, when a user interface object (e.g., the second user interface object 306) is located further away from the respective user, it may be challenging for the respective user to recognize, or resolve features (e.g., read characters) in, the user interface object located further away from the respective user.

This problem is addressed by increasing the size of the user interface object. As shown in FIG. 3, a third user interface object 308 that is larger than the first user interface object 304 is located at the distance D2 from the eye 302. When the third user interface object 308 is viewed from the eye 302, the third user interface object 308 occupies the first angle α. Thus, both the first user interface object 304 located at the distance D1 and the third user interface object 308 located at the distance D2 occupy the same angle when viewed from the eye 302. As a result, the respective user may recognize the user interface object 308 located at the distance D2 from the eye 302 as easily as recognizing the user interface object 304 located at the distance D1 from the eye 302.

However, increasing the size of the user interface object excessively reduces the remaining area of a display screen that may be used for displaying other content (e.g., a television program). Thus, there needs to be a more systematic approach to increasing the size of the user interface object. In some implementations, the size of the user interface object is increased in accordance with a scaling factor. In some implementations, the scaling factor is determined in accordance with the distance between the eye 302 (or the respective user) and a display screen that displays the user interface object so that the angle occupied by the user interface object remains substantially the same (e.g., the angle occupied by the user interface object varies less than five, ten, or twenty percent when the distance between the respective user and the user interface object doubles).

Figure 4A:
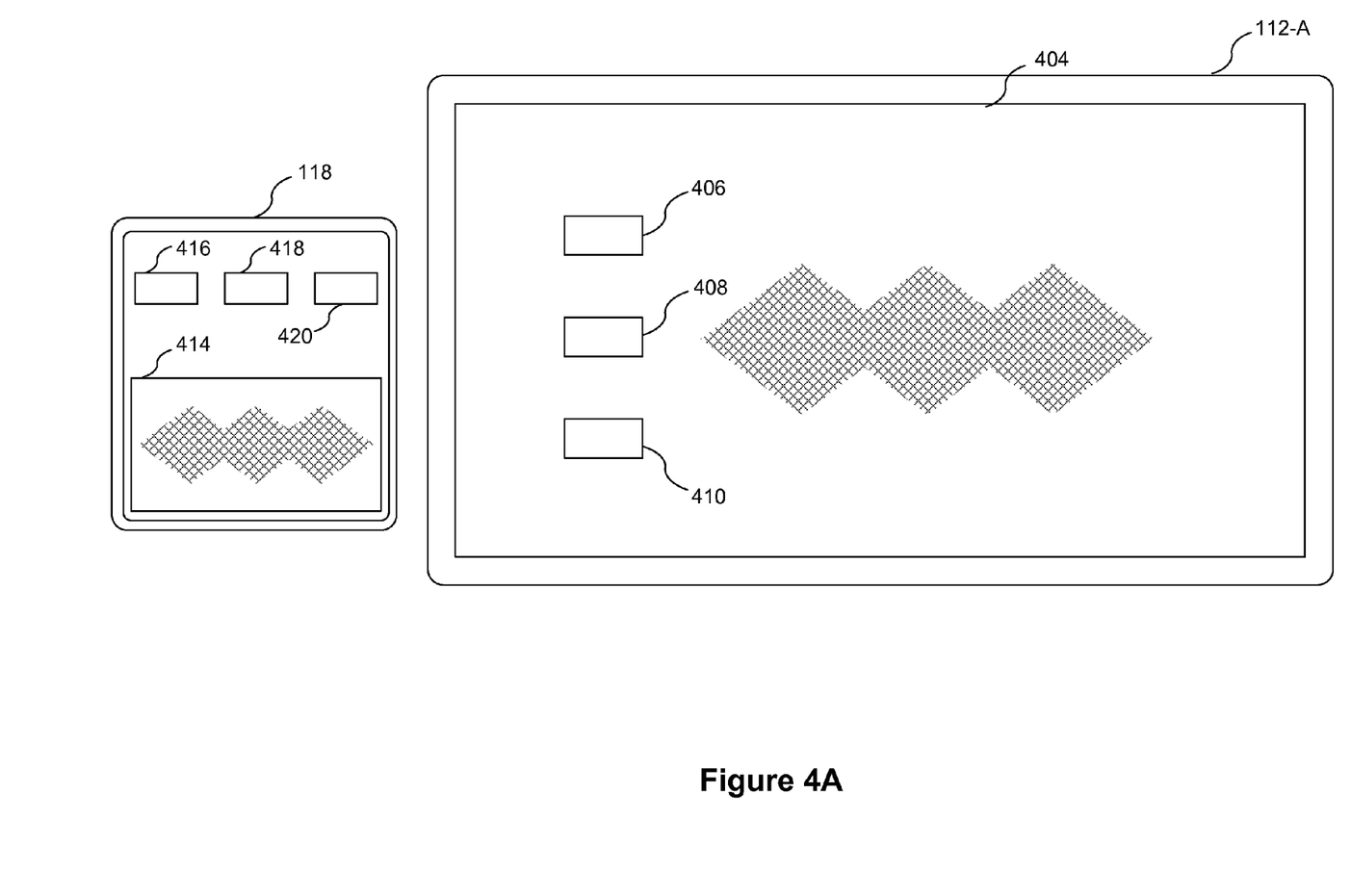
FIGS. 4A-4C illustrate exemplary user interfaces in accordance with some implementations.
Figure 4B:
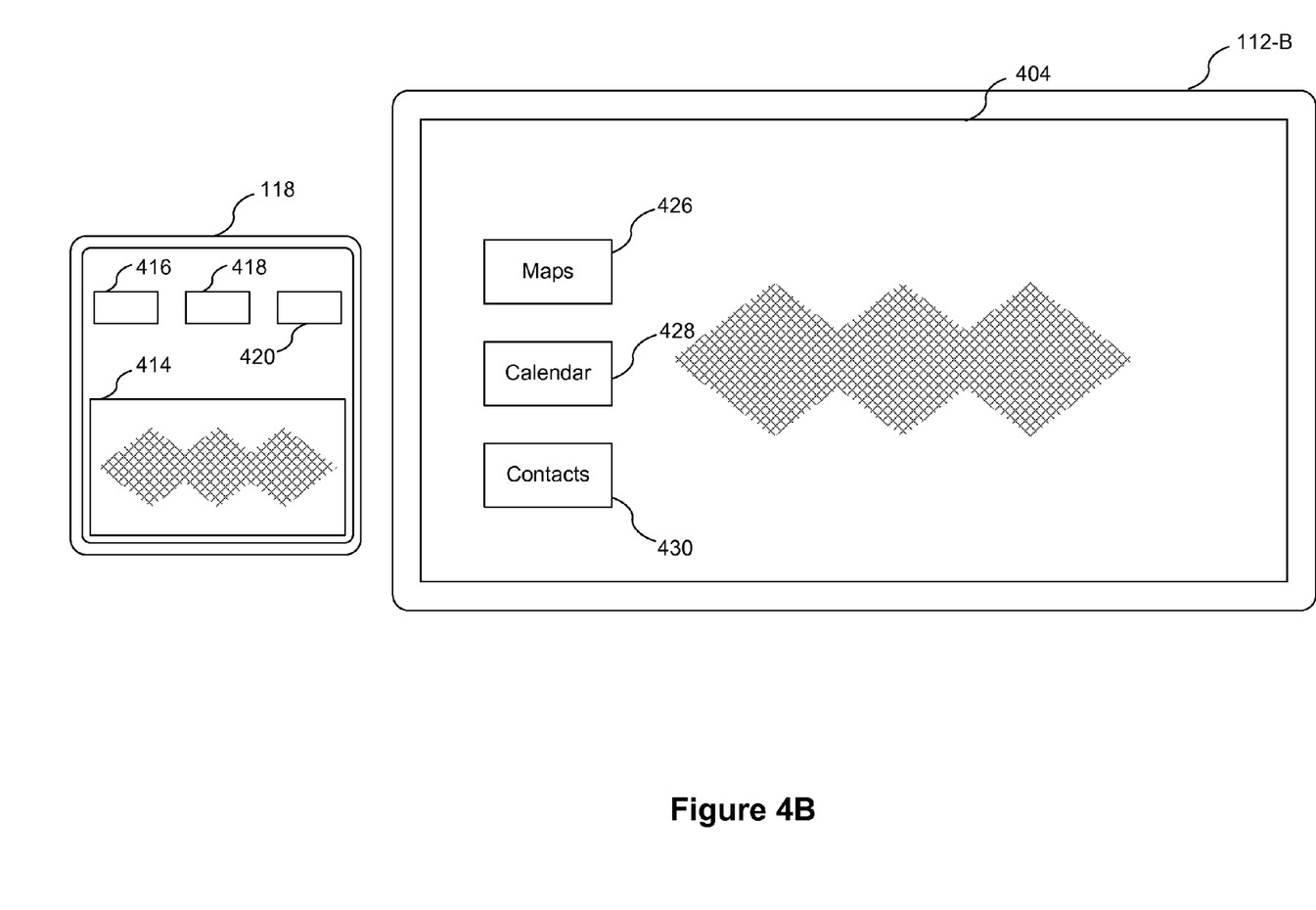
Figure 4C:
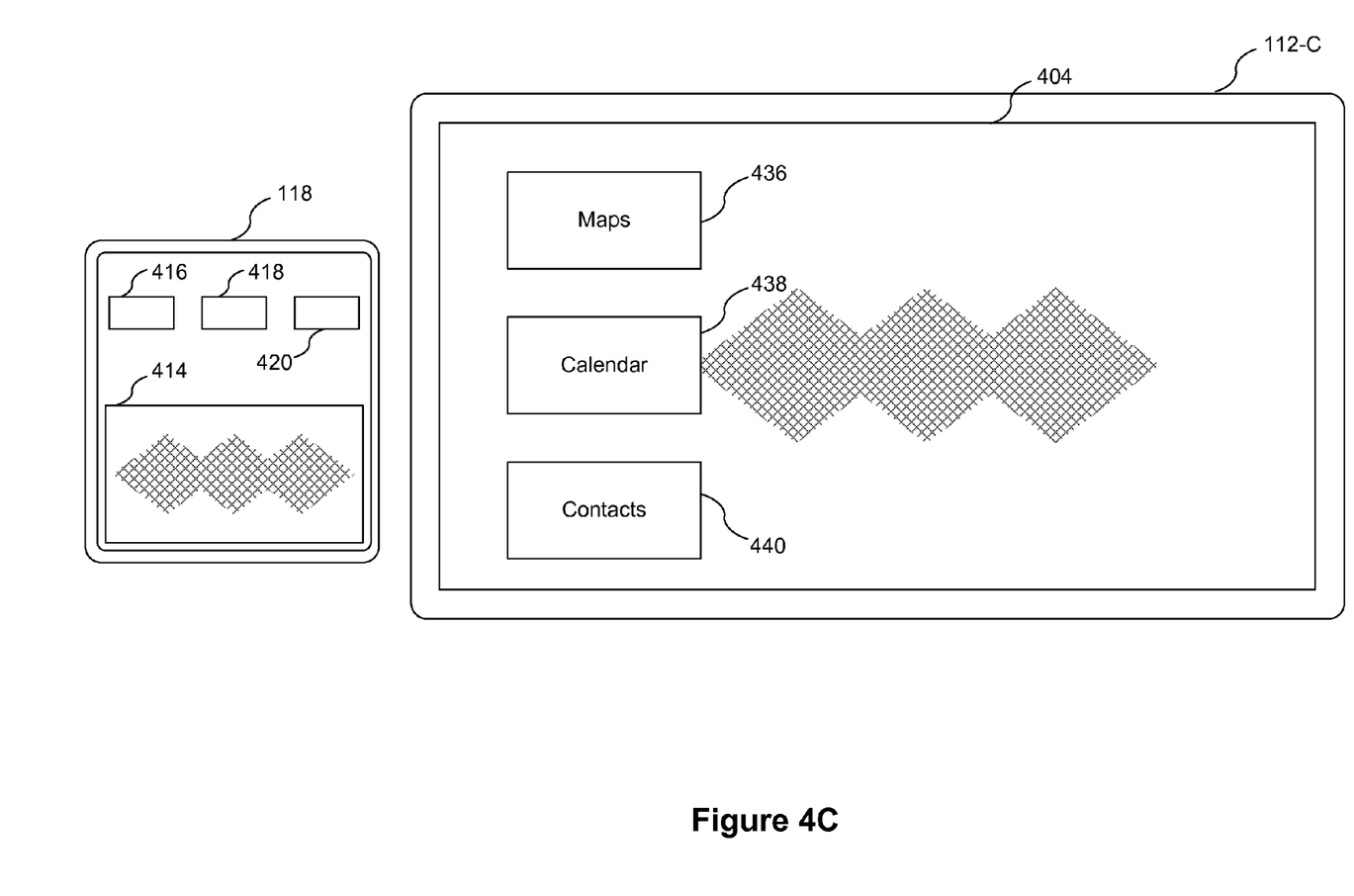

FIGS. 4A-4C illustrate exemplary user interfaces displayed on a television screen 112 and a personal device 118 (e.g., a mobile phone, a tablet computer, a notebook computer, a desktop computer, etc.) in accordance with some implementations. It should be noted that FIGS. 4A-4C are not drawn to scale.

In FIG. 4A, the personal device 118 displays a scene 414 from a television program. The television screen 112-A displays a corresponding scene 404 from the television program. Typically, the scene 404 is scaled to fit a predefined region of the television screen 112-A (e.g., the entire television screen 112-A or a portion thereof). Thus, the size of the scene 404 (and its scaling factor) displayed on the television screen 112-A is often determined solely based on the size of the television screen 112-A, and the scaling factor does not change in accordance with the distance between the television screen 112-A and a respective user watching the television screen 112-A.

The personal device 118 also displays user interface objects 416, 418, and 420. The size of each user interface object (e.g., the user interface object 416, 418, or 420) is often characterized with a number of pixels (e.g., 100 pixel-wide and 50 pixel-high). The television screen 112-A displays corresponding user interface objects 406, 408, and 410, where each of the corresponding user interface objects 406, 408, and 410 has the same number of pixels as respective user interface objects 416, 418, and 420. Because the size of a pixel on the display of the personal device 118 may be different from the size of a pixel on the television screen 112-A, the user interface object 406, 408, and 410 may be displayed on the television screen 112-A larger than the corresponding user interface objects 416, 418, and 420 displayed on the personal device 118 (e.g., the personal device and the television screen typically have different video resolutions, such as 240, 320, or 480 dpi for mobile phones and 20 to 80 dpi for television screens). However, a user watching the television screen 112-A from a distance may still have difficulty recognizing (or reading characters in) the user interface object.

FIG. 4B illustrates an exemplary user interface displayed on the television screen 112-B in accordance with some implementations. The television screen 112-B concurrently displays the scene 404 from the television program and user interface objects 426, 428, and 430 that correspond to the user interface objects 416, 418, and 420 displayed on the personal device 118. The user interface objects 426, 428, and 430 are scaled so that the user watching the television screen 112-B from a distance can easily recognize the user interface objects 426, 428, and 430. The scaling factor for scaling the user interface objects 426, 428, and 430 is determined in accordance with a distance parameter that corresponds to a distance between the user and the television screen 112-B. It should be noted that the scene 404 rendered on the television screen 112-B has the same size as the scene 404 rendered on the television screen 112-A (FIG. 4A). In other words, the scene 404 is rendered in accordance with a scaling factor that is independent from the distance between the user and the television screen 112.

FIG. 4C illustrates an exemplary user interface displayed on the television screen 112-C in accordance with some implementations. The television screen 112-C concurrently displays the scene 404 from the television program and user interface objects 436, 438, and 440 that correspond to the user interface objects 416, 418, and 420 displayed on the personal device 118. The television screen 112-C is located further away from the user than the television screen 112-B. Thus, the user interface objects 436, 438, and 440 are rendered larger than the corresponding user interface objects 426, 428, and 430 (FIG. 4B).

FIG. 5 is a block diagram illustrating an exemplary data structure for the device characteristics 226 (FIG. 2), in accordance with some implementations. The device characteristics 226 include the following, or a subset or superset thereof:

(optional) a device identifier 502, which indicates a type of the computer system 200 (e.g., whether the computer system is integrated with the television screen 112 or whether the computer system is a physically separable from the television screen 112, such as a set-top box);

a screen resolution 504, which identifies the resolution of the television screen (e.g., the television screen 112) or a resolution mode the television screen is operating in (e.g., 1080 p or 720 p);

a variable scaling factor 506, which is used for rendering one or more user interface objects;

(optional) a predefined distance 508, which is a presumed distance between a user and the television screen (e.g., the television screen 112), typically preselected by an engineer or a software developer;

(optional) a measured distance 510, which is an actual distance between the user and the television screen (e.g., the television screen 112);

(optional) a user provided distance 512, which is a distance between the user and the television screen (e.g., the television screen 112) as provided by the user; and (optional) a screen size 514, which is a size of the television screen (e.g., the television screen 112).

As stated previously, the device characteristics 226 may include more or fewer data fields. In some implementations, the device characteristics 226 include a predefined scaling factor, which may be provided instead of, or in addition to, the predefined distance 508. The predefined scaling factor may be used unless the measured distance or the user provided distance deviates from the predefined distance by more than a predefined threshold.

Figure 6:
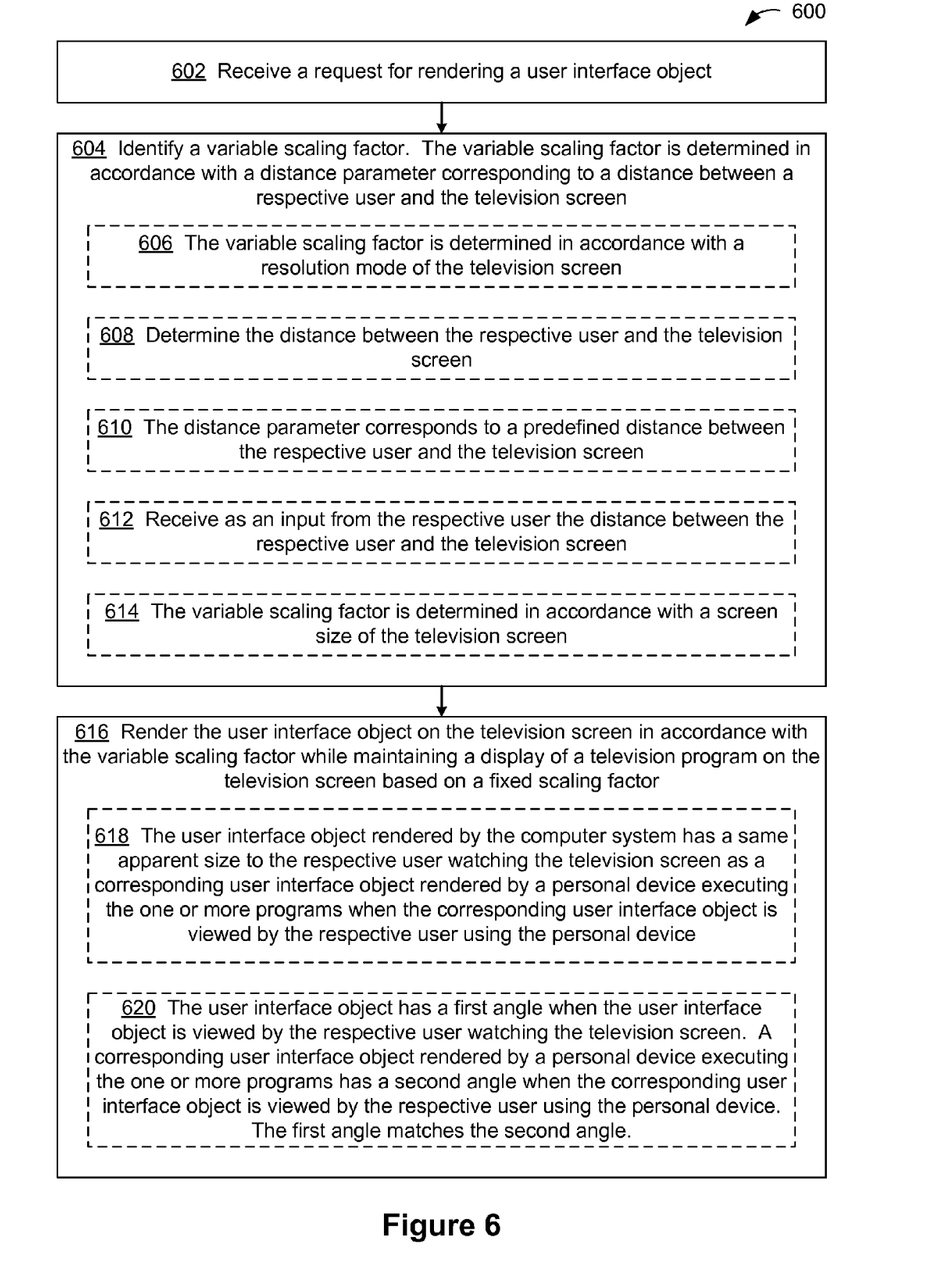
FIG. 6 is a flowchart representing a method for rendering a user interface object in accordance with a variable scaling factor, in accordance with some implementations.

FIG. 6 is a flowchart representing a method 600 for rendering a user interface object in accordance with a variable scaling factor, in accordance with some implementations. The method is performed at a computer system (e.g., the computer system 200, FIG. 2) coupled with a television screen (e.g., the television screen 112). The computer system includes one or more processors (e.g., the CPU(s) 202, FIG. 2) and memory (e.g., the memory 206) storing one or more programs, for execution by the one or more processors, for rendering one or more user interface objects on the television screen.

The system receives (602) a request for rendering a user interface object. For example, one of the applications 122 (e.g., a media player 220, FIG. 2) may send to the application service module 216 a request for rendering one or more user interface objects, and the system receives the request through the application service module 216.

The system identifies (604) a variable scaling factor. For example, the system may retrieve the variable scaling factor 506 from the device characteristics 226. In some implementations, the system determines (e.g., calculates) the variable scaling factor 506 prior to receiving the request. In some implementations, the system determines (e.g., calculates) the variable scaling factor 506 in response to receiving the request. The variable scaling factor is determined in accordance with a distance parameter corresponding to a distance between a respective user and the television screen. In some implementations, the variable scaling factor is increased proportionally to the distance parameter. For example, when the distance between the respective user and the television screen changes from five-feet to ten-feet, the variable scaling factor doubles.

In some implementations, the variable scaling factor is represented as a multiplier. For example, the variable scaling factor may have a value of one when the size of the user interface object need not be increased. When the size of the user interface object needs to be doubled, the variable scaling factor may have a value of two. In some implementations, the variable scaling factor is expressed using the unit of video resolution (e.g., dots-per-inch). For example, for a display that has an actual video resolution of 50 dpi, rendering a user interface object at a 200 dpi resolution has the effect of increasing the size of the user interface object by four times.

In some implementations, the variable scaling factor is determined (606) in accordance with a resolution mode of the television screen. In some implementations, the variable scaling factor is increased proportionally to the resolution of the television screen. For example, when the resolution mode of the television screen increases by 50% (e.g., from 720 p to 1080 p), the variable scaling factor also increases by 50% (e.g., from 213 dpi to 320 dpi).

In some implementations, the system determines (608) the distance between the respective user and the television screen. For example, the system may use the distance sensor 208 (FIG. 2) to determine the distance between the respective user and the television screen (e.g., the television screen 112).

In some implementations, the distance parameter corresponds (610) to a predefined distance (e.g., the predefined distance 508) between the respective user and the television screen. Thus, the distance parameter need not be based on the actual distance between the respective user and the television screen.

In some implementations, the system receives (612) as an input from the respective user the distance between the respective user and the television screen. The distance received from the respective user may be stored in the device characteristics 226 as the user provided distance 512. In some implementations, the distance parameter corresponds to the distance received from the respective user.

In some implementations, the variable scaling factor is determined (614) in accordance with a screen size of the television screen. For example, when the screen size of the television screen doubles (at the same resolution), the variable scaling factor is reduced by half. In some implementations, the variable scaling factor is determined in accordance with the screen size and the resolution of the television screen. In some implementations, the video resolution is first determined from the screen size and the resolution of the television screen, and in turn, the variable scaling factor is determined in accordance with the video resolution. For example, comparing a thirty-inch television screen at a 720 p resolution and a forty-inch television screen at the same 720 p resolution, a respective pixel in the forty-inch television screen is larger than each pixel in the thirty-inch television screen. Thus, a fewer pixels are required to display a user interface object on the forty-inch television screen compared to displaying a corresponding user interface object of the same size on the thirty-inch television screen.

The system renders (616) the user interface object on the television screen in accordance with the variable scaling factor while maintaining a display of a television program on the television screen based on a fixed scaling factor. As illustrated in FIGS. 4B and 4C, the user interface objects illustrated in FIGS. 4B and 4C (e.g., the user interface objects 426, 428, 430, 436, 438, and 440) are rendered in accordance with the variable scaling factor (e.g., rendered large or small based on the variable scaling factor), while the scene 404 from the television program is displayed in accordance with the fixed scaling factor (e.g., the size or zoom of the scene 404 remains independent of the distance between the respective user and the television screen).

In some implementations, the system renders the user interface object on the television screen in accordance with the variable scaling factor by increasing the size of the user interface object based on the variable scaling factor. In some implementations, the user interface object is stored based on vector graphics so that the system can readily scale the size of the user interface object. In some implementations, the system stores a set of corresponding user interface objects, where each user interface object has a distinct size. The system may retrieve the user interface object of a particular size based on the variable scaling factor.

In some implementations, the system renders the user interface object on the television screen in accordance with the variable scaling factor while maintaining a display of a first content (e.g., a photo, movie, game, etc.) on the television screen based on the fixed scaling factor.

In some implementations, the user interface object rendered by the computer system has (618) a same apparent size to the respective user watching the television screen as a corresponding user interface object rendered by a personal device executing the one or more programs when the corresponding user interface object is viewed by the respective user using the personal device. The television screen is located further away from the respective user than the personal device. For example, the user interface object 416 (FIG. 4B) has the same apparent size as the user interface object 426 when viewed by a user at respective distances. As explained with respect to FIG. 3, the user interface object 308 has the same apparent size to the user as the user interface object 304.

In some implementations, the user interface object has (620) a first angle when the user interface object is viewed by the respective user watching the television screen. The television screen is located further away from the respective user than the personal device. A corresponding user interface object rendered by a personal device executing the one or more programs has a second angle when the corresponding user interface object is viewed by the respective user using the personal device. The first angle matches the second angle. For example, in FIG. 3, the user interface object 308 and the user interface object 304 occupy the same angle when viewed by the user.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will be understood that, although the terms first, second, etc. have been used herein to describe various elements, these elements should not be limited by these terms. These terms are only used to distinguish one element from another. For example, a first angle could be termed a second angle, and, similarly, a second angle could be termed a first angle. The first angle and the second angle are both angles, but they are not the same angle.

The terminology used in the description of the implementations herein is for the purpose of describing particular implementations only and is not intended to be limiting of the claims. As used in the description of the implementations and the appended claims and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

What is claimed is:

1. A method for rendering one or more user interface objects on a television screen, comprising:
    at a computer system coupled with the television screen, the computer system comprising one or more processors and memory storing one or more programs, for execution by the one or more processors, for rendering the one or more user interface objects on the television screen, the method comprising:
    receiving a request for rendering a user interface object;
    identifying a variable scaling factor; and
    rendering the user interface object on the television screen in accordance with the variable scaling factor while maintaining a display of media content on the television screen based on a fixed scaling factor, wherein the user interface object is independent of the media content;
    wherein the variable scaling factor is determined in accordance with a distance parameter corresponding to a distance between a respective user and the television screen and wherein the variable scaling factor is determined so that the user interface object rendered by the computer system has a first angle of incidence at the eye of the respective user watching the television screen that is substantially the same as a second angle of incidence of a corresponding user interface object rendered by a personal device executing the one or more programs, wherein the second angle of incidence is at the eye of the respective user when the corresponding user interface object is viewed by the respective user using the personal device.

2. The method of claim 1, wherein the variable scaling factor is determined in accordance with a resolution mode of the television screen.

3. The method of claim 1, further comprising determining the distance between the respective user and the television screen.

4. The method of claim 1, wherein the distance parameter corresponds to a predefined distance between the respective user and the television screen.

5. The method of claim 1, further comprising receiving as an input from the respective user the distance between the respective user and the television screen.

6. The method of claim 1, wherein the variable scaling factor is determined in accordance with a screen size of the television screen.

7. A computer system coupled with a television screen for rendering one or more user interface objects on the television screen, comprising:
    one or more processors;
    memory storing one or more programs, for execution by the one or more processors, for rendering the one or more user interface objects on the television screen, the one or more programs including instructions for:
    receiving a request for rendering a user interface object;
    identifying a variable scaling factor; and
    rendering the user interface object on the television screen in accordance with the variable scaling factor while maintaining a display of media content on the television screen based on a fixed scaling factor, wherein the user interface object is independent of the media content;
    wherein the variable scaling factor is determined in accordance with a distance parameter corresponding to a distance between a respective user and the television screen and wherein the variable scaling factor is determined so that the user interface object rendered by the computer system has a first angle of incidence at the eye of the respective user watching the television screen that is substantially the same as a second angle of incidence of a corresponding user interface object rendered by a personal device executing the one or more programs, wherein the second angle of incidence is at the eye of the respective user when the corresponding user interface object is viewed by the respective user using the personal device.

8. The computer system of claim 7, wherein the variable scaling factor is determined in accordance with a resolution mode of the television screen.

9. The computer system of claim 7, the one or more programs further include instructions for determining the distance between the respective user and the television screen.

10. The computer system of claim 7, wherein the variable scaling factor is determined in accordance with a screen size of the television screen.

11. A non-transitory computer readable storage medium storing one or more programs for execution by one or more processors of a computer system coupled with a television screen, the one or more programs including instructions for:
    receiving a request for rendering a user interface object;
    identifying a variable scaling factor; and
    rendering the user interface object on the television screen in accordance with the variable scaling factor while maintaining a display of media content on the television screen based on a fixed scaling factor, wherein the user interface object is independent of the media content;
    wherein the variable scaling factor is determined in accordance with a distance parameter corresponding to a distance between a respective user and the television screen and wherein the variable scaling factor is determined so that the user interface object rendered by the computer system has a first angle of incidence at the eye of the respective user watching the television screen that is substantially the same as a second angle of incidence of a corresponding user interface object rendered by a personal device executing the one or more programs, wherein the second angle of incidence is at the eye of the respective user when the corresponding user interface object is viewed by the respective user using the personal device.

12. The computer readable storage medium of claim 11, wherein the variable scaling factor is determined in accordance with a resolution mode of the television screen.

13. The computer readable storage medium of claim 11, wherein the one or more programs further include instructions for determining the distance between the respective user and the television screen.

14. The computer readable storage medium of claim 11, wherein the variable scaling factor is determined in accordance with a screen size of the television screen.

* * * * *